Dec. 2, 1958   R. NOACK ET AL   2,862,431
PHOTOGRAPHIC SHUTTER

Filed Dec. 9, 1955   4 Sheets-Sheet 1

INVENTOR.
Rolf Noack
Werner Hahn
BY Karl Kromer
  and
Johannes Weise

Dec. 2, 1958  R. NOACK ET AL  2,862,431
PHOTOGRAPHIC SHUTTER
Filed Dec. 9, 1955  4 Sheets-Sheet 2

INVENTOR.
Rolf Noack
BY Werner Hahn
Karl Kromer
and
Johannes Weise

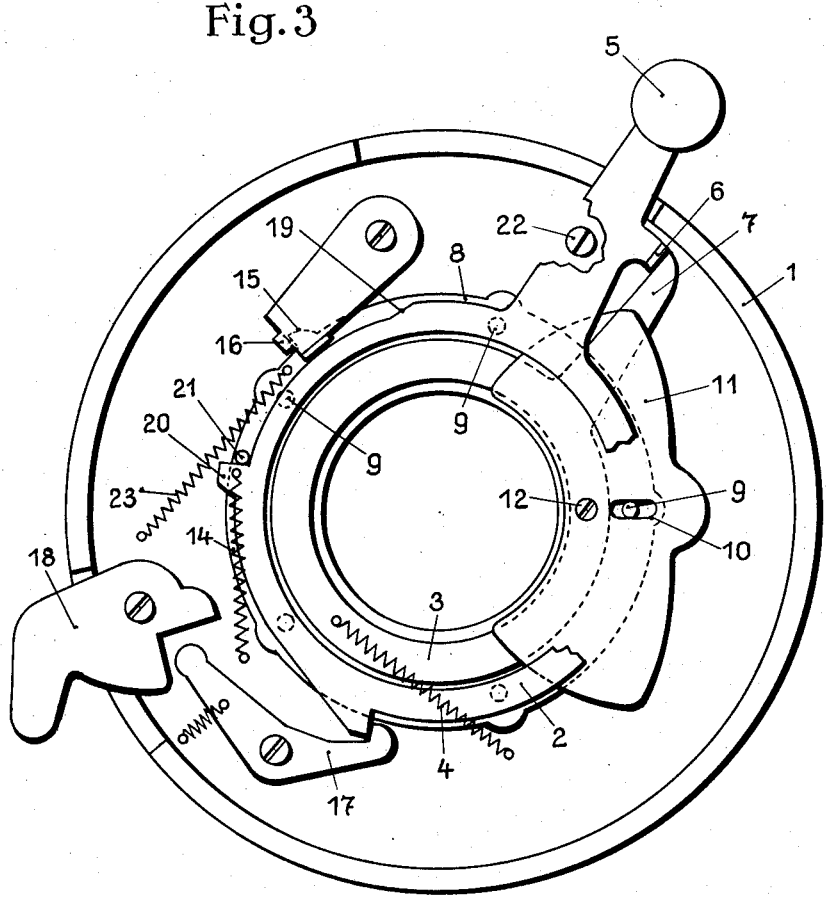

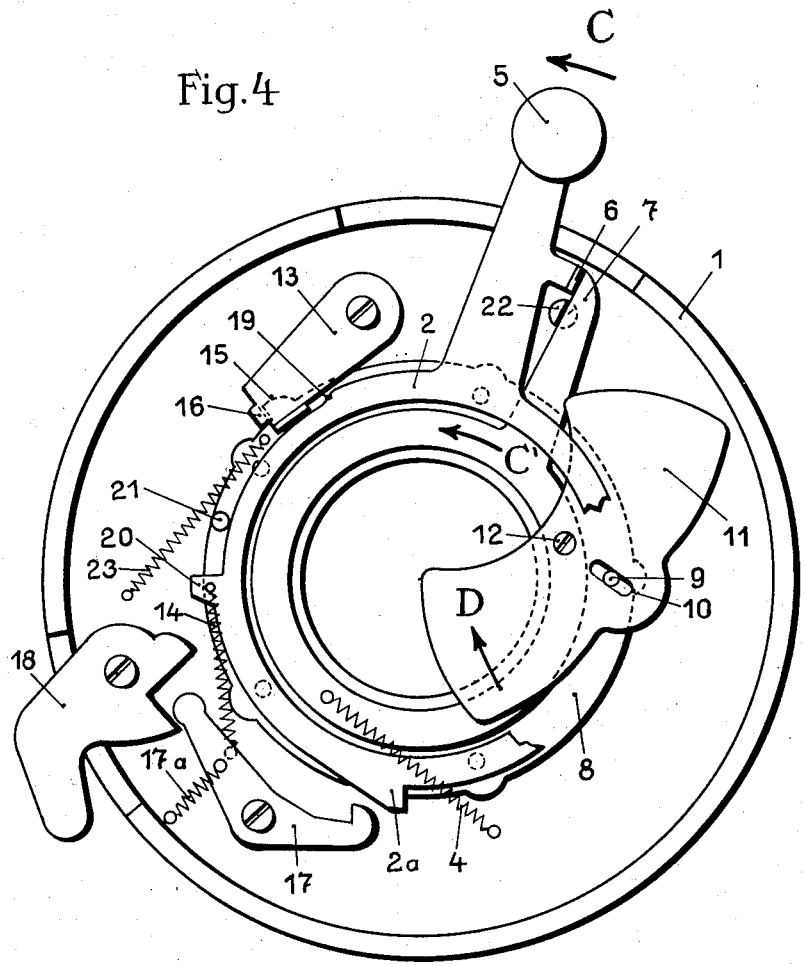

United States Patent Office 2,862,431
Patented Dec. 2, 1958

2,862,431

PHOTOGRAPHIC SHUTTER

Rolf Noack and Werner Hahn, Dresden, and Karl Krömer, Radebeul, and Johannes Weise, Dresden, Germany, assignors to VEB Zeiss Ikon Dresden, Dresden, Germany Application December 9, 1955, Serial No. 552,235

8 Claims. (Cl. 95—63)

The present invention relates to photographic shutters and more particularly to such shutters which are provided with a plurality of sectors angularly displaceable about pivots mounted on a sector-carrying ring. The ring is capable of reciprocating rotary movement resulting in the additional opening of the shutter for the purpose of adjusting, for example, a reflex camera when it is desired to observe the subject reflected in the camera.

Sector-carrying rings have been known and used heretofore, but all these devices have the serious disadvantage of necessitating manual operation. Thus it has been necessary to additionally actuate the lever of the shutter when opening the shutter for view finding.

It is the object of the subject invention to overcome this disadvantage by providing an arrangement whereby the shutter is opened upon actuation of the shutter gripping lever and is automatically closed immediately after the release. To accomplish this, the improvement provides a so-called tension ring whose actuation by means of a gripping lever imparts tension to a spring biasing the sector-carrying ring and thus urging the sectors into closed position; at the same time the actuated gripping lever engages an arm of the sector-carrying ring and sets the latter under tension while the shutter is opened.

The above and other objects and advantages of the present invention will become more evident from the following description when taken in conjunction with the accompanying drawings, in which:

Fig. 3 is a similar view, illustrating a subsequent intermediate point of the tensioning procedure; and Fig. 4 is a similar view, illustrating release of the shutter after termination of the tensioning procedure for picture taking.

Figure 1:
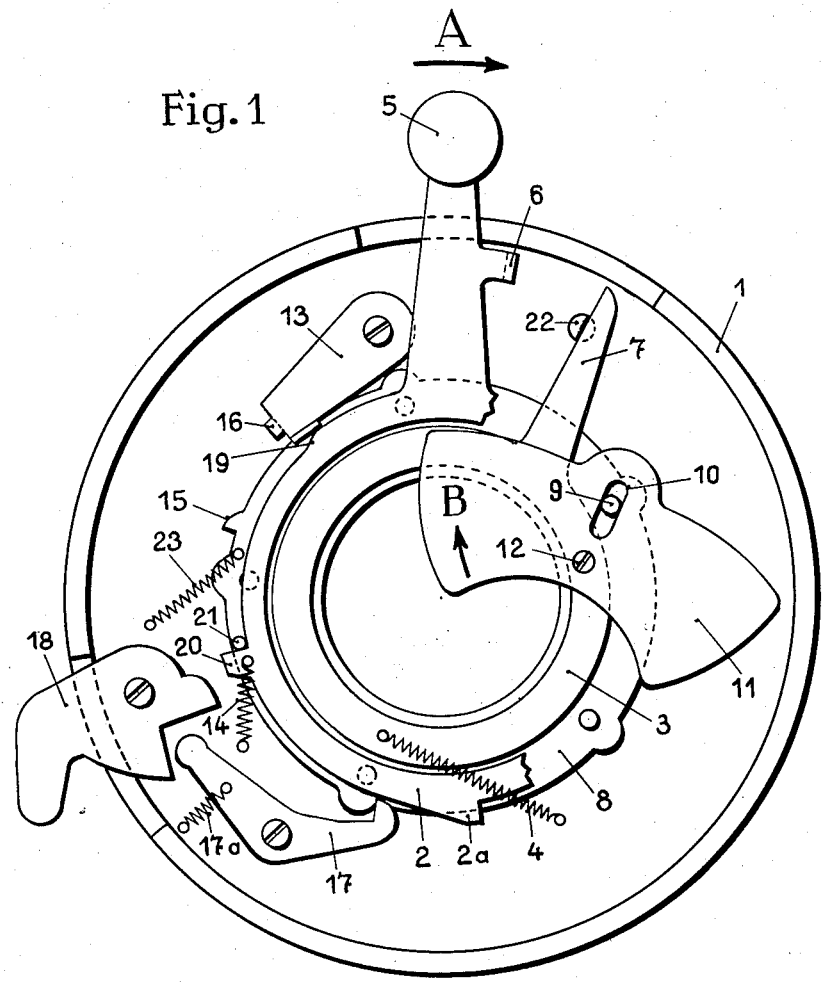
Fig. 1 is a front elevational view of the shutter in released or starting position of the sectors prior to the taking of a picture.

Referring to the drawings, casing 1 of the camera carries tension ring 2 rotatable thereon and biased in a counterclockwise direction by a spring 14; a sector-actuating ring 8, also rotatable on casing 1 and biased in a counterclockwise direction by a spring 23, is provided with a plurality of pins 9 which are engaged in slots 10 of sectors or leaves 11. For the sake of clarity one sector only is shown in each of the various figures. Spring 4 urges a sector-carrying ring 3, also rotatable on casing 1, counterclockwise and into a position effective to set sectors 11 into their initial aperture-closing position. Sector-carrying ring 3 is integral with arm 7 which lies in the path of projecting lug 6 of gripping arm 5 of tension ring 2 and is limited in its counterclockwise movement by stop 22. Pawl 13 is swingable on a pivot which is mounted on casing 1. The pawl is provided with a lug 16 engageable with the flat surface of a projection 15 on the sector-actuating ring 8 for holding the same in its tensioned position and bears against the outer peripheral surface of tension ring 2. Lock detent or catch 17 arranged for holding tension ring 2 in its tensioned position is biased toward the ring 2 by a spring 17a and can be brought out of engagement with a nose 2a of said tension ring upon actuation of release arm 18. Spring 14 tends to return the tension ring 2 from its tensioned position and spring 23 tends to return the sector-actuating ring 8 from its tensioned position. On the tension ring 2 is further provided a cam portion 19 engageable with the lower part of the pawl 13, while the sector-actuating ring 8 carries a pin 21 engageable with a projection 20 on the tension ring 2.

Figure 2:
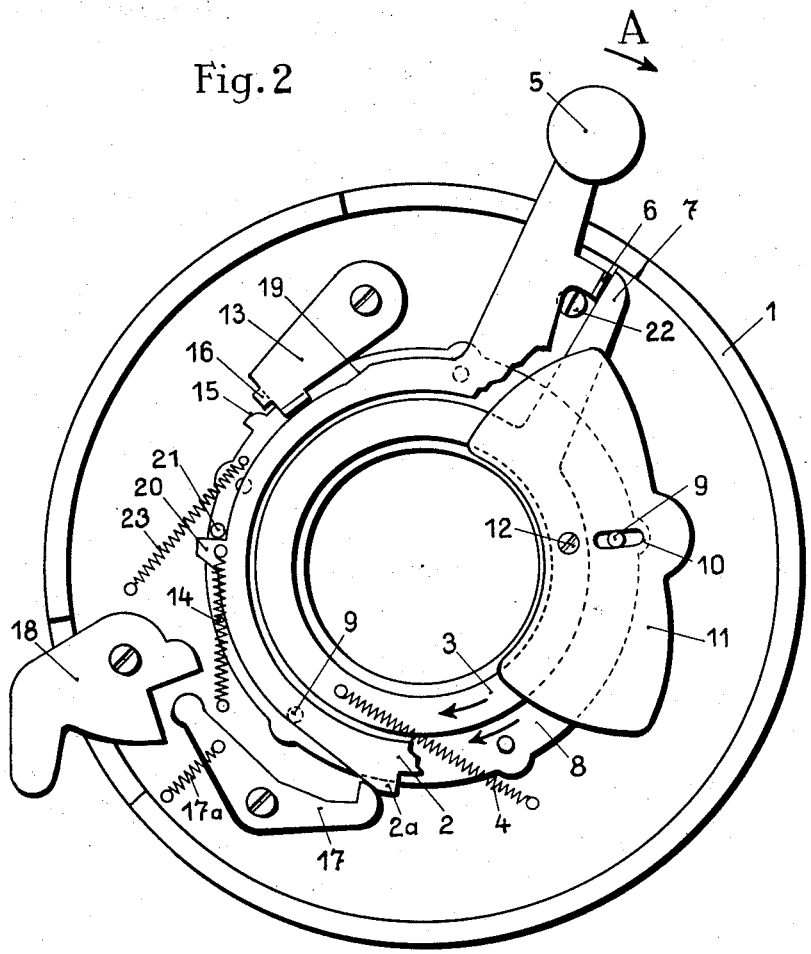
Fig. 2 is a similar view of the shutter, illustrating an intermediate point of the tensioning procedure with the sectors in aperture-opening position for focusing of the camera and view finding.

The released shutter (Fig. 1) is tensioned by rotational movement of the lever 5 in a clockwise direction as indicated by the arrow A whereby the reflex mirror is concurrently moved into its reflecting or view-finding position and the film in the camera is covered. During this rotation, the tension ring 2 entrains the sector-actuating ring 8 into joint clockwise rotation through the intermediary of the projection or nose 20 which engages the pin 21. Due to the pin and slot connection 9—10 provided between the sector-actuating ring and each of the sectors 11, the latter are rotated from their first aperture-closing position about their pivots 12 as indicated by the arrow B. As soon as the sectors 11 have uncovered the shutter aperture, i. e., when the sectors and their actuating ring have executed about one half of their maximum stroke, the lug 6 of the gripping arm 5 comes into contact with the arm 7 arranged on the sector-carrying ring 3 (Fig. 2). Consequently, upon further clockwise rotation of the tension ring 2 in the direction of arrow A not only the sector-actuating ring 8 but also the sector-carrying ring 3 is entrained into rotation. The sectors 11, during this time interval remain in their aperture-opening position due to the fact that the sector-actuating ring 8 and the sector-carrying ring 3 move at the same angular speed in the same direction, whereby the relative motion between the rings 8 and 3 which is needed for rotating or rocking the sectors 11 cannot take place. Thereafter, as soon as the tensioned or set position of the shutter is attained (Fig. 3), the detent 17 is snapped over the nose 2a and the pawl 13 over the projection 15 to prevent automatic releasing of the rings 2 and 8, respectively.

Once the shutter has been tensioned, the object to be photographed can be viewed and brought into focus through the open shutter aperture. Upon subsequent depression of the release lever 18, the detent or latch member 17 is disengaged from the nose 2a of the tension ring 2 (Fig. 4). The latter thus is rotated counterclockwise in the direction of the arrow C under the force of the spring 14 and is followed by the sector-carrying ring 3 which rotates in the same direction (see arrow C') under the force of the spring 4. Since during this time interval the sector-actuating ring 8 remains in its tensioned position due to the latching engagement of the pawl 13 with the projection 15, there is produced as a result of the rotation of the sector-carrying ring 3 a relative motion between the latter and the ring 8 which effects a rotary movement of the shutter sectors 11 in the direction of the arrow D to their second aperture-closing position. Near the end of this closing movement, the sector-carrying ring 3 is brought to a halt when its arm 7 abuts against the stop 22. The tension ring 2, however, rotates still further.

After the film covering has been removed and the mirror pivoted out of the view-finding position thereof, which may advantageously be effected by the counterclockwise rotating tension ring 2 through the intermediary of any suitable means, the cam portion 19 contacts the lower part of the pawl 13 and pivots the latter in a clockwise direction. As a result, the lug 16 is swung out of the path of the projection 15, thereby freeing the sector-actuating ring 8 for counterclockwise rotation under the force of the spring 23. The so-rotating ring 8 now effects a reverse pivoting of the sectors 11 about their axes 12 and to their initial aperture-closing position, whereby the aperture is briefly opened for the exposure of the film. It will, of course, be appreciated that the duration of the exposure interval, i. e., the time taken by the sectors in moving from their position shown in Fig. 4 to their position shown in Fig. 1, can be varied through the provision of suitable means for braking the speed of rotation of the ring 8 in a manner well known to the art.

Thus it will be readily seen that the entire procedure requires only two distinct manual operations on the part of the photographer, assuming the shutter to be initially in its closed and released state. These operations are, first, moving the arm 5 from its rest position to such an extent as to tension the shutter, i. e., to bring the sectors 11 from their first aperture-closing position to their aperture-opening position, concurrently therewith to position the reflex mirror of the camera across the optical axis of the objective for view finding, and to cause the latch 17 to snap onto the nose 2a of the tension ring 2, at which time the camera may be focused, and, second, depressing the release lever or button 18 which thereafter and in one continuous sequence causes the sectors 11 to be brought to their second aperture-closing position, the reflex mirror to be pivoted out of the optical axis of the camera objective, and the sectors to be moved without interruption from their second aperture-closing position to their aperture-opening position (for exposure of the film in the camera) and thence to their first aperture-closing (released) position.

While the invention has been described in connection with one embodiment thereof, it will be easily understood that it is not limited thereto.

Whatever the variations and modifications in the design of the mechanism, the essential features of the invention consist in a structural arrangement where, without recurring to manual operation, the actuation of the shutter tensioning device causes the simultaneous opening of the sectors, and where on or after the release of the shutter the sectors are automatically closed.

What we claim is:

1. In a camera shutter having a casing, an objective aperture, and a plurality of aperture-controlling sectors; first, second and third coaxial ring members rotatably supported by said casing about said aperture, an abutment member connected to said first ring member, pivot members mounting said sectors, respectively, on said first ring member at spaced peripheral locations for rocking movement substantially in a plane between said first and third ring members, a pin and slot connection between each of said sectors and said second ring member, an actuating arm connected to said third ring member, a lug on said arm and engageable with said abutment member, spring means connecting said ring members, respectively, to said casing and biasing said ring members for rotation in a first direction substantially parallel to said plane, a stop on said casing for engagement by said abutment member to limit the extent of rotation of said first ring member in said first direction, a nose on said third ring member, a spring-biased latch mounted on said casing and engageable with said nose to lock said third ring member against rotation in said first direction subsequent to rotation of said third ring member through a predetermined angle in a second direction, an operating member for releasing said latch from said nose, a first projection on said third ring member, a stud on said second ring member engageable with said first projection, a second projection on said second ring member, a pawl pivotally mounted on said casing and engageable with said second projection upon rotation of said second ring member through a predetermined angle in said second direction to inhibit rotation of said second ring member in said first direction, and a cam on said third ring member engageable with said pawl, subsequent to release of said latch from said nose, for pivoting said pawl away from said second projection to permit rotation of said second ring member in said first direction after partial rotation of said third ring member in said first direction.

2. In a camera shutter having a casing and a plurality of shutter sectors; a sector-carrying ring rotatably mounted on said casing and supporting said sectors for rocking movement about respective axes substantially parallel to the axis of rotation of said sector-carrying ring, a sector-actuating ring concentric with said sector-carrying ring and rotatably mounted on said casing, a pin and slot connection between each of said sectors and said sector-actuating ring, a tension ring concentric with said sector-actuating and carrying rings and rotatably mounted on said casing, a plurality of resilient members connected to said rings, respectively, and to said casing and biasing said rings for rotation in a first direction about said axis of rotation, a manipulating arm extending from said tension ring and accessible from the exterior of said casing for angular movement between first and second end positions, first cooperable and engageable abutment means on said manipulating arm and said sector-carrying ring, stop means on said casing limiting the extent of rotation of said sector-carrying ring relative to said tension ring in said first direction, whereby said first abutment means become engaged to ensure joint rotation of said tension and sector-carrying rings only when said manipulating arm is moved in a second direction about said axis of rotation from said first end position and through an angle greater than a predetermined minimum, detent means mounted on said casing for latching said tension ring against rotation in said first direction subsequent to movement of said manipulating arm to said second end position and consequent rotation of said tension ring through a predetermined angle in said second direction, an operating member accessible from the exterior of said casing for releasing said detent means from said tension ring, second cooperable and engageable abutment means on said tension and sector-actuating rings for ensuring, when engaged, joint rotation of said last-named rings only in said second direction, pawl means mounted on said casing and engageable with said sector-actuating ring to latch the same against rotation in said first direction subsequent to said joint rotation of said tension and sector-actuating rings in said second direction, and cam means on said tension ring for disengaging said pawl means from said sector-actuating ring and permitting rotation of the latter in said first direction a predetermined time interval after release of said detent means and the consequent start of said rotation of said tension ring in said first direction and after termination of said rotation of said sector-carrying ring in said first direction by said stop means.

3. In a camera shutter having a casing with an objective aperture, and a plurality of shutter sectors disposable in first and second aperture-closing end positions and in an intermediate aperture-opening position, respectively; a sector-carrying ring rotatably mounted on said casing around said aperture and supporting said sectors for rocking movement about respective axes substantially parallel to the axis of rotation of said sector-carrying ring, a sector-actuating ring concentric with said sector-carrying ring and rotatably mounted on said casing, a pin and slot connection between each of said sectors and said sector-actuating ring, a tension ring concentric with said sector-carrying and actuating rings and rotatably mounted on said casing, a plurality of resilient members connected to said rings, respectively, and to said casing and biasing said rings codirectionally toward respective initial angular positions relative to said axis of rotation, first manually operable means for rotating said tension ring, said sector-actuating ring and said sector-carrying ring from said initial angular positions thereof to respective final angular positions relative to said axis of rotation while effecting a relative angular motion between said sector-actuating ring and said sector-carrying ring to rock said sectors from said first aperture-closing end position into said aperture-opening position, multi-part latch means for holding said rings in said final angular positions thereof against the forces of said resilient members, and second manually operable means for disengaging a part of said latch means to permit joint rotation of said tension and sector-carrying rings relative to said sector-actuating ring to thereby rock said sectors from said aperture-opening position into said second aperture-closing end position, and for thereafter terminating the rotation of said sector-carrying ring at said initial angular position thereof while disengaging another part of said latch means to permit rotation of said sector-actuating ring to said initial angular position thereof, to thereby rock said sectors without interruption from said second aperture-closing end position into said aperture-opening position and thence into said first aperture-closing end position.

4. In a camera shutter having a casing with an objective aperture, and a plurality of shutter sectors disposable in first and second aperture-closing end positions and in an intermediate aperture-opening position, respectively; a sector-carrying ring rotatably mounted on said casing about said aperture and supporting said sectors for rocking movement about respective substantially parallel axes, a sector-actuating ring rotatably mounted on said casing, a pin and slot connection between each of said sectors and said sector-actuating ring, a tension ring rotatably mounted on said casing, biasing means connected to said rings, respectively, and to said casing and urging said rings toward respective initial angular positions relative to the axis of said aperture, first manually operable means for rotating said tension ring, said sector-actuating ring and said sector-carrying ring from said initial angular positions thereof to respective final angular positions relative to said axis of said aperture, while effecting a relative angular motion between said sector-actuating ring and said sector-carrying ring to rock said sectors from said first aperture-closing end position into said aperture-opening position, multi-part latch means for holding said rings in said final angular positions thereof against the forces of said biasing means, and second manually operable means for disengaging a part of said latch means to permit joint rotation of said tension and sector-carrying rings toward said initial angular positions thereof while said sector-actuating ring remains stationary, to thereby rock said sectors from said aperture-opening position into said second aperture-closing end position, and for thereafter terminating the rotation of said sector-carrying ring at said initial angular position thereof while disengaging another part of said latch means to permit rotation of said sector-actuating ring to said initial angular position thereof, to thereby rock said sectors without interruption from said second aperture-closing end position into said aperture-opening position and thence into said first aperture-closing end position.

5. In a camera shutter provided with an objective aperture and with a plurality of shutter sectors normally disposed in a first aperture-closing end position and arranged for rocking movement to an intermediate aperture-opening position and to a second aperture-closing end position, respectively; first manually operable means for rocking said sectors from said first aperture-closing end position into said aperture-opening position, and second manually operable means for thereafter and in one continuous sequence rocking said sectors from said aperture-opening position into said second aperture-closing end position and thence back via said aperture-opening position into said first aperture-closing end position.

6. In a camera shutter according to claim 5; latch means normally inoperative and arranged to be rendered operative by said first manually operable means upon movement of the latter from a starting position thereof to a terminal position thereof for retaining said sectors in said aperture-opening position and for concurrently retaining said first manually operable means in said terminal position, said latch means being arranged to be rendered inoperative by said second manually operable means.

7. In a camera shutter according to claim 6; said latch means comprising two parts both of which are rendered operative simultaneously by said first manually operable means upon movement thereof to said terminal position, one of said parts of said latch means being arranged to be rendered inoperative by said second manually operable means directly to permit partial return of said first manually operable means toward said starting position thereof and concurrent rocking of said sectors into said second aperture-closing end position, said first manually operable means including cam means for rendering the other part of said latch means inoperative a predetermined time interval subsequent to actuation of said second manually operable means to permit said rocking of said sectors from said second aperture-closing end position back into said first aperture-closing end position during completion of the return of said first manually operable means to said starting position thereof.

8. In a camera shutter according to claim 7; said first manually operable means comprising three concentric rings rotatable both jointly with and relative to one another, said one part of said latch means cooperating with a first one of said rings, said sectors being rockably mounted on a second one of said rings and loosely connected with the third one of said rings, said other part of said latch means cooperating with said third ring, said cam means being disposed on said first ring.

References Cited in the file of this patent

UNITED STATES PATENTS

| 1,166,921 | McPhee | Jan. 4, 1916 |
| 2,412,681 | Fuerst | Dec. 17, 1946 |